(12) United States Patent
Phillips

(10) Patent No.: US 6,188,898 B1
(45) Date of Patent: *Feb. 13, 2001

(54) MOBILE COMMUNICATIONS NETWORK

(75) Inventor: John Alexander Phillips, Harlow (GB)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/996,863

(22) Filed: Dec. 23, 1997

(30) Foreign Application Priority Data

Dec. 23, 1996  (GB) .................................................. 9626772

(51) Int. Cl.[7] ....................................................... H04Q 7/20

(52) U.S. Cl. ........................... 455/433; 455/433; 455/422; 455/439; 455/560; 455/432

(58) Field of Search ..................................... 455/426, 550, 455/552, 553, 561, 403, 422, 432, 433

(56) References Cited

U.S. PATENT DOCUMENTS

| | | | |
|---|---|---|---|
| 4,829,554 | * | 5/1989 | Barnes et al. .......................... 379/58 |
| 5,289,179 | * | 2/1994 | Beeson, Jr. et al. .................. 340/826 |
| 5,732,076 | * | 3/1998 | Ketseoglou et al. .................. 370/347 |
| 5,802,469 | * | 9/1998 | Nounin et al. ....................... 455/422 |
| 5,822,693 | * | 10/1998 | Harrison ............................... 455/432 |
| 5,913,162 | * | 6/1999 | Gourdin et al. ...................... 455/424 |

* cited by examiner

Primary Examiner—Thanh Cong Le
Assistant Examiner—Meless N Zewdu
(74) Attorney, Agent, or Firm—Lee, Mann, Smith, McWilliams, Sweeney & Ohlson

(57) ABSTRACT

A mobile communications network is adapted to service mobile terminals having different operating protocols. The network includes multimode base stations each capable of operating selectively in at least some of said operating protocols and each having means for interrogating a mobile terminal so as to determine that terminal's operating protocol. A store contains sets of operating instructions, one for each protocol, which are downloaded to a base station controller so as to operate the base station serving that mobile terminal in a mode consistent with the terminal's operating protocol.

8 Claims, 4 Drawing Sheets

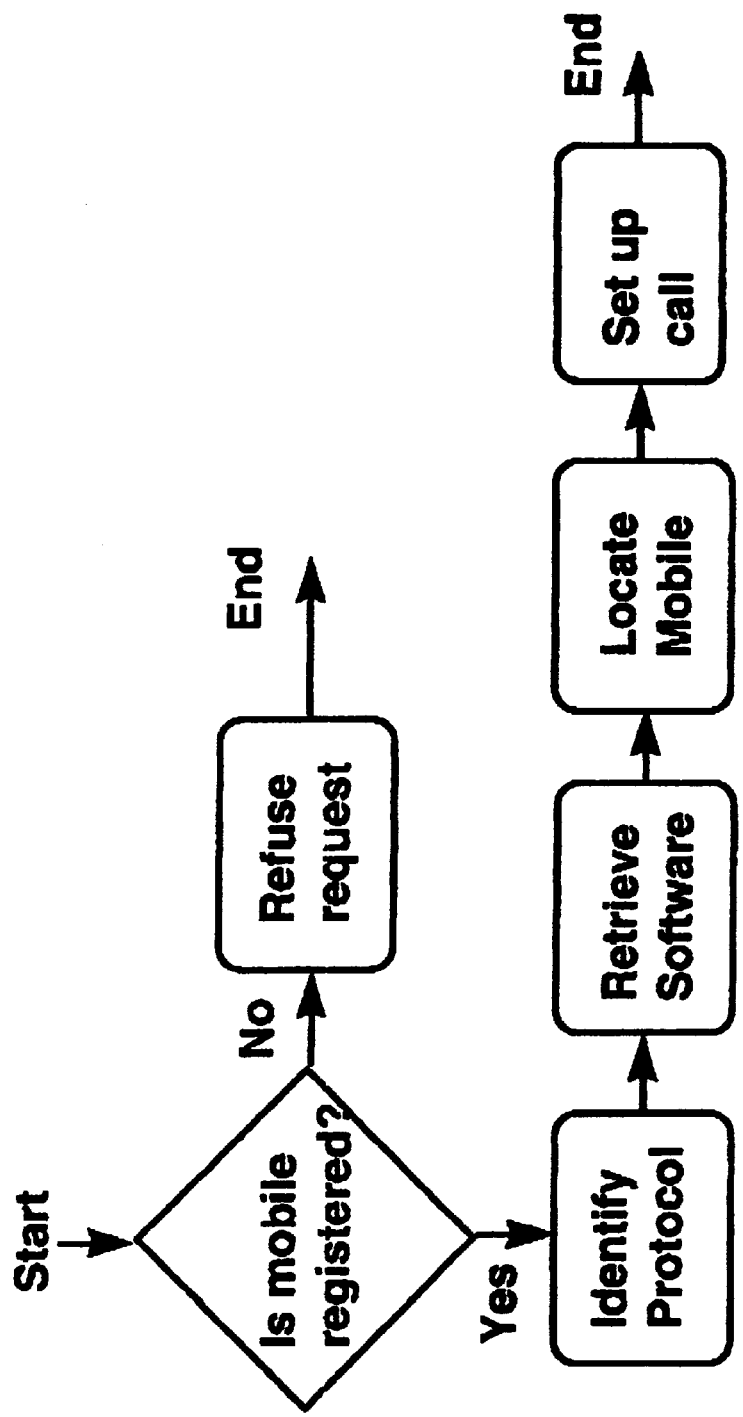

MOBILE COMMUNICATIONS NETWORK

This invention relates to mobile communications networks and in particular to arrangements and methods for controlling communication between mobile terminals and a base station in such networks.

BACKGROUND OF THE INVENTION

A number of standard mobile communications systems are currently under development. For example, in Europe the GSM900 system operating at 900 MHz is gaining wide acceptance while in North America the near equivalent PCS1900 system is a current standard operating at 1900 MHz. Within each of these systems a set of standard operating procedures has evolved, and all equipment supplied for use in such a system must conform to the corresponding standard. This provides a significant advantage to the system operator as he can obtain equipment from a number of suppliers and be confident that it will be fully compatible. For example, the operator may purchase handsets from one manufacturer, base stations from another and mobile switching centres from a third. Although this provides the operator in that he can force down the costs of the purchased equipment, there are attendant disadvantages.

Firstly, the key protocols defining the standard must be conceived at the original installation of the system. If these protocols have not been chosen with sufficient care and forethought, adherence to the standard can preclude the adoption of more advantageous techniques that may subsequently become available. Secondly, although the key protocols may be defined, there is often considerable scope for the provision of proprietary services that can provide added value to a particular manufacturer's product. This provides the operator with the problem of supporting different equipment designs. In practice a particular operator supports only one service mix and users of equipment, e.g. handsets, capable of providing other services may well find that those services are not supported. Thirdly, there is increasing concern about the proliferation of base station installations that are required to service a variety of mobile communications systems that are operating in the same geographical region and there is thus a need to minimise the number of such installations.

SUMMARY OF THE INVENTION

The object of the invention is to minimise or to overcome these disadvantages.

It is a further object of the invention to provide an improved mobile communications system.

It is a further object of the invention to provide a mobile communications system that can service mobile terminals having different operating protocols.

According to one aspect of the invention there is provided a mobile communications network for serving a plurality of mobile terminals each capable of being coupled to the network, wherein the network incorporates means for determining for each mobile terminal accessing the network an operating protocol employed by that terminal, and means for retrieving from a store a corresponding a corresponding operating protocol whereby to provide control instructions for the network so as to enable communication with that terminal.

According to another aspect of the invention there is provided a mobile communications network adapted to service mobile terminals having different operating protocols, the network including a plurality of multimode base stations each capable of operating selectively in at least some of said operating protocols and each having means for interrogating a said mobile terminal so as to determine that terminal's operating protocol, a store containing sets of operating instructions one for each said protocol, base station control means for controlling the operation of each said base station, and means responsive to the determination of the operating protocol of a said mobile terminal for downloading the corresponding set of operating instructions from the store to the control means whereby to operate the base station serving that mobile terminal in a mode consistent with that operating protocol.

According to a further aspect of the invention there is provided a method of operating a mobile communications network so as to service a plurality of terminals each capable of being coupled to the network, wherein the method includes storing a plurality of operating protocols for said terminals, determining for each terminal accessing the network an operating protocol employed by that terminal, and retrieving from the stored protocols a corresponding operating protocol whereby to provide control instructions for that terminal.

By providing access to software packages appropriate to the terminals communicating with the system, a variety of terminal operating protocols can be accommodated. this is of particular advantage in a large international system as terminals that have been constructed to comply with individual country requirements and/or with a particular service mix can roam throughout the system and can receive a full or substantially full range of services in all parts of the system. This also facilitates the development and introduction of new terminals which can operate in parallel with existing devices.

In a development of the network, the operating packages provided in the system may be updated to take account of developments in mobile terminal construction and the introduction to enhanced protocols and services.

In another development, the mobile terminals may be adapted to download operating software from the network over the air interface to provide those terminals with particular operating characteristics.

In a further development of the network, both the network and the terminals may be provided with software packages which allow the particular operating protocol to be negotiated between the network and the terminal at the commencement of communication therebetween.

BRIEF DESCRIPTION OF THE DRAWINGS

An embodiment of the invention will now be described with reference to the accompanying drawings in which;

FIG. 4 is a flow chart illustrating the set-up of a mobile terminal terminated call in the network of FIG. 1.

DESCRIPTION OF PREFERRED EMBODIMENT

Figure 1:
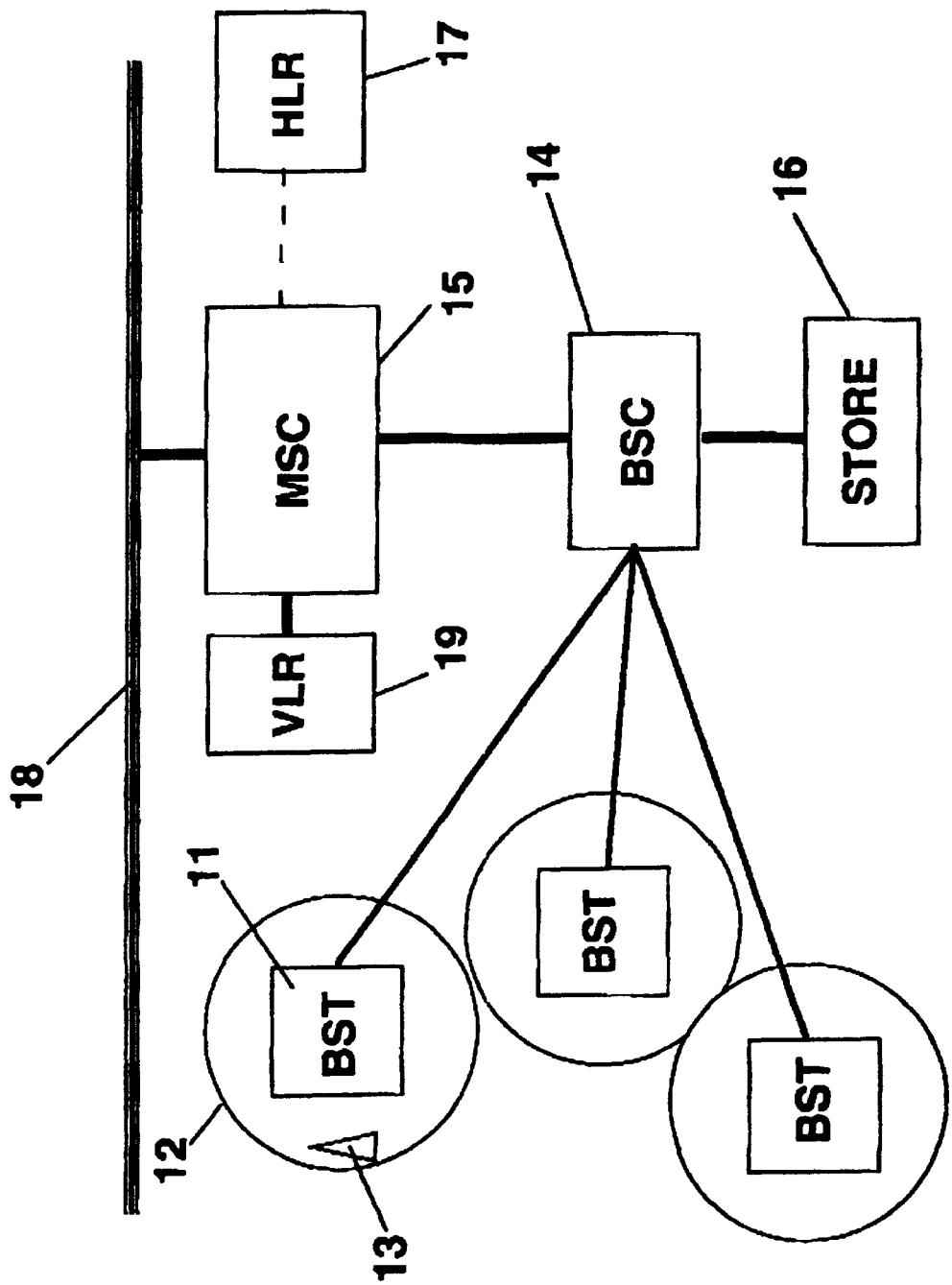
FIG. 1 is a schematic diagram of a mobile communications system.

Referring to FIG. 1, the mobile communications system includes a plurality of multimode base stations 11 each of which defines a respective cell 12 within which communications may be established with mobile terminals 13 currently located within that cell. Groups of base stations 11 are controlled via a base station controller 14 from a mobile switching centre 15. The mobile switching centre has access to a home location register 17 and, via a communications path 18, to one or more other mobile switching centres (not shown) and to one or more fixed networks (not shown). Advantageously, traffic on the path 18 may be carried in a broad band format such as asynchronous transfer mode (ATM) and at a rate appropriate to the particular protocol to which that traffic relates.

Information on the mobile terminals is stored in the home location register 17 which may be disposed at a location remote from the mobile switching centre. Information relating to those mobile terminals currently in the service area of the mobile switching centre is retrieved from the home location register and stored together with current location information in a visitors location register 19. Advantageously, the visitors location register forms part of the mobile switching centre.

In the network of FIG. 1, the base stations operate at appropriate frequencies to provide a communications service and also provide a beacon function for those mobile communications protocols that require such a function. For example, the system may provide access to mobile terminals using the GSM 900, DECT, and DCS 1800 protocols. It will be understood that this group of protocols is by no means exclusive and that other existing or future protocols can be accommodated.

Figure 2:
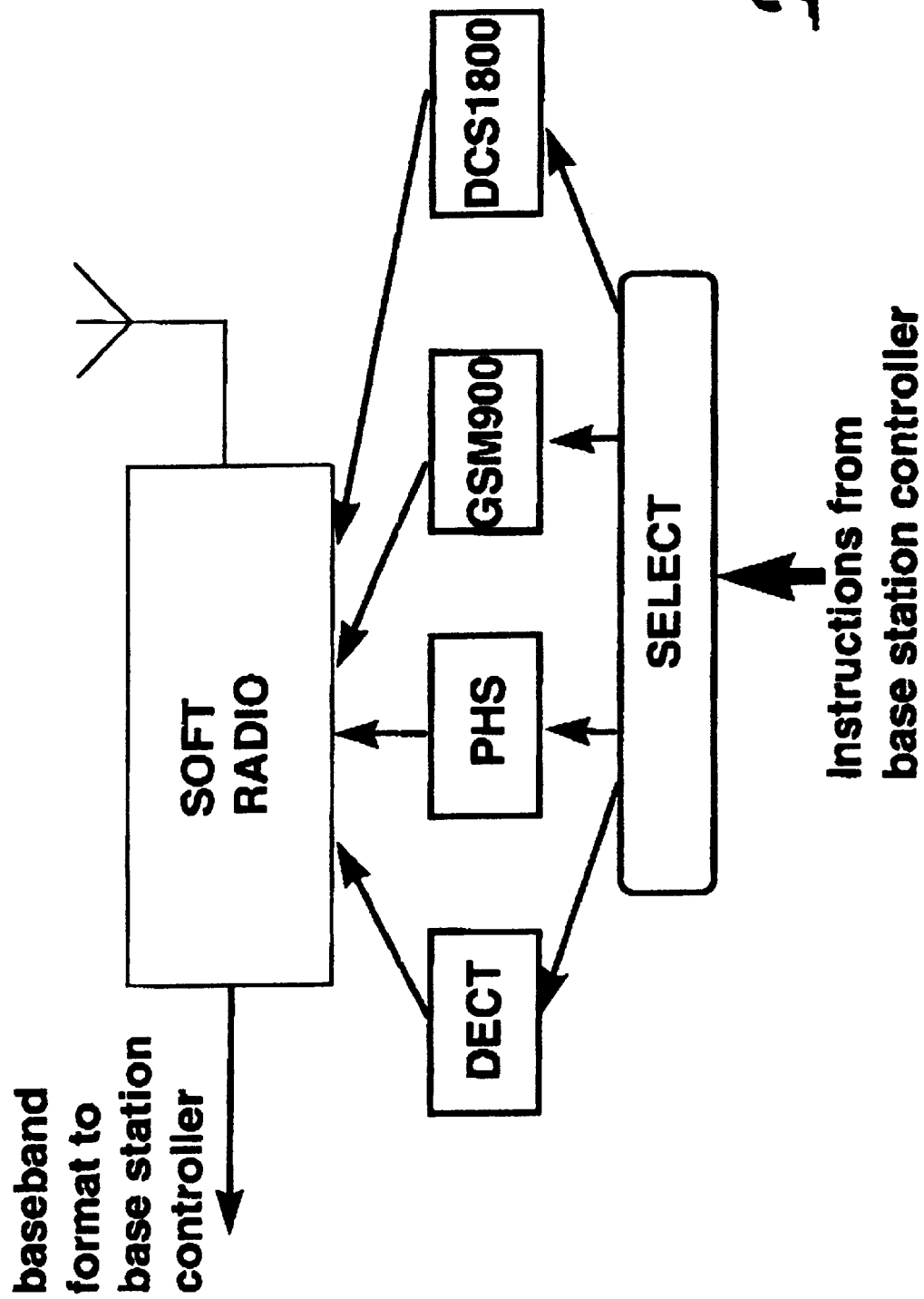
FIG. 2 illustrates the provision of software to a multimode base station in the system of FIG. 1.

FIG. 2 shows the general construction of a base station for use in the system of FIG. 1. The station comprises a soft radio unit 21 coupled to an antenna 22 and which functions as a slave in both transmit and receive modes under the control of a selected one of a number of protocol dedicated control units 23.

Figure 3:
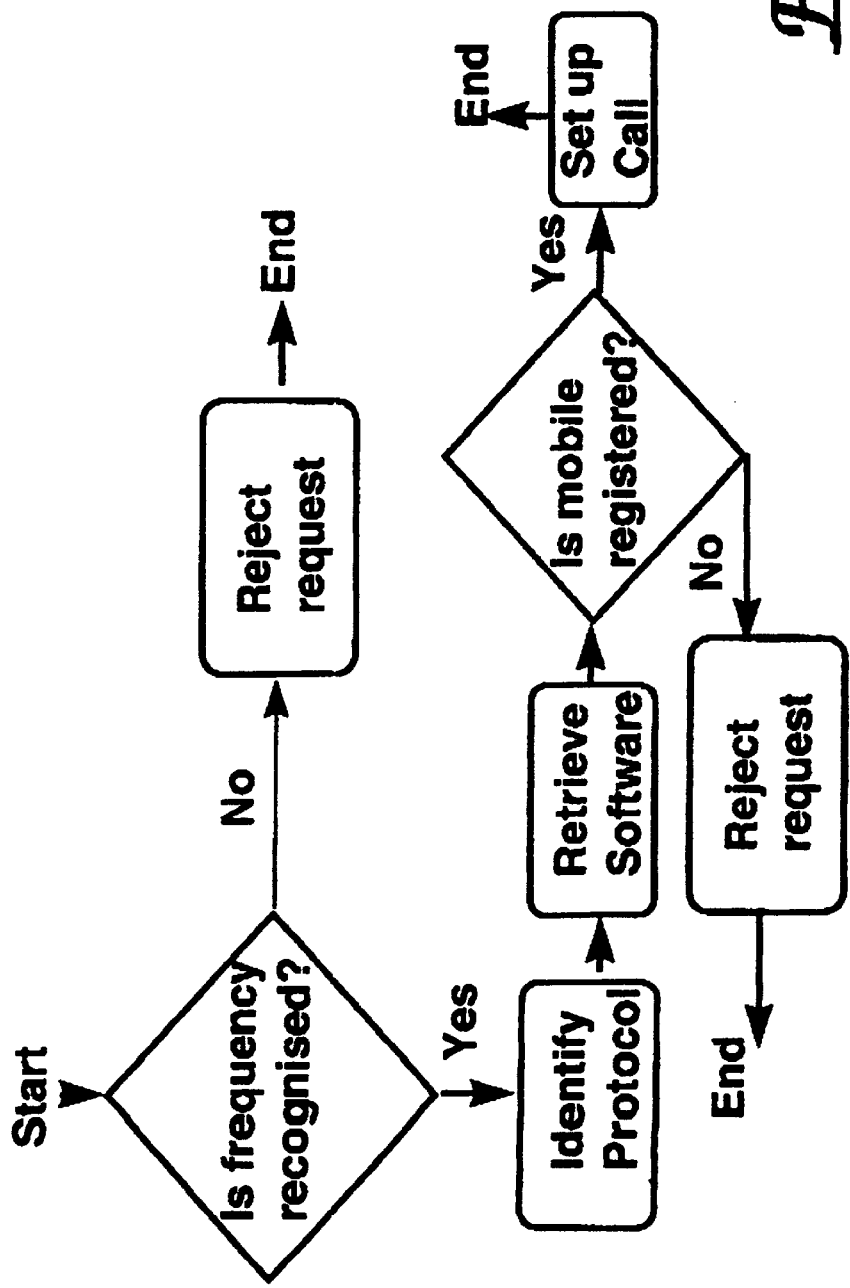
FIG. 3 is a flow chart illustrating the set-up of a mobile terminal originated call in the network of FIG. 1.

For a mobile terminal initiated call, the terminal will emit a request for service on its frequency band according to its built-in operating protocol. This request is used by the network to determine the terminal's protocol, the general procedure being illustrated in FIG. 3.

When a base station receives a request for service from a mobile terminal in its service area, it relays the request to the base station controller which determines, from the frequency band and the format of the request signal, which protocol is being employed by the requesting mobile terminal. This determination may be effected by the use of a soft radio receiver that is programmed to recognise the presence of radio frequency transmissions from a mobile terminal within a frequency band extending over all the supported protocols. Measurement of the particular frequency employed by the mobile terminal establishes the required protocol for communication with that terminal. If a number of protocols are permitted within a given frequency band, then a further test will be required to identify the protocol uniquely. If the frequency is not recognised, then the call request is aborted.

When the protocol has been identified, the corresponding software package is retrieved from the store and downloaded into the base station controller so as to operate the base station controller according to the desired protocol. At the same time, the appropriate dedicated control unit in the base station is enabled under control from the base station controller. The details of the mobile terminal are then checked to ensure that the terminal is registered and the call is set up according to the desired protocol.

FIG. 4 shows the process sequence for setting up a call to a mobile terminal. The details of that terminal's operating protocol and last reported location are retrieved from the home location register. If the terminal is registered, the appropriate mobile switching centre then interrogates its visitors location register to determine a paging pattern for the mobile terminal so as to determine which base station controller(s) need to be provided with the appropriate software package to service the mobile terminal via a base station. If the terminal is not registered then the call attempt is refused.

Messaging within the wired portion of the mobile network to accommodate the various message and signalling protocols appropriate to each operating protocol is effected by encapsulating the traffic in packets each containing a payload and a header whereby routing and handling of the packet can be determined. In an alternative embodiment, this traffic can be converted into a common transmission format at interfaces (not shown) provided at appropriate ingress and egress points to the mobile network. This common format may be employed to provide e.g. Internet services to mobile terminals served by the network.

In a further embodiment, some or all of the mobile terminals may be programmable via software downloaded over the air interface from the mobile network via the base station in response to a request from a terminal. The downloading can be performed at call set-up or during the call. This technique can be used to provide a terminal with functionality that conforms to one of a set of preferred protocols.

It will be understood that the above description of a preferred embodiment is given by way of example only and that various modifications may be made by those skilled in the art without departing from the spirit and scope of the invention.

What is claimed is:

1. A cellular mobile communications network adapted to service mobile terminals having different operating protocols so as to provide roaming facilities for those terminals, the network including a plurality of multimode base stations each capable of being operated selectively via a base station controller in at least some of said different operating protocols, a home location register in which information relating to terminals registered with the network is stored, and a mobile switching centre providing access to a fixed network, wherein each base station controller has means for determining, from a request for service received from a mobile terminal currently within an area served by that base station controller the operating protocol requirement of that terminal so as to set up a call from that terminal to the network, wherein each base station controller has means for determining from the information stored in the home location register the operating protocol requirement of a terminal currently within the area served by that base station controller to which a call is to be placed so as to set up a call to that terminal from the network, and wherein the base station controller has means for downloading from a store associated with the base station controller a set of operating instructions for that protocol required by the terminal, and wherein the base station has selection means responsive to the determination by the base station controller of the operating protocol of a said mobile terminal for enabling a control means for that protocol so as to operate the base station in a mode consistent with that operating protocol.

2. A network as claimed in claim 1, wherein each said base station comprises a soft radio unit for providing radio communication to said terminals, operating means, one for each said operating protocol, and means for selectively enabling a said one of said operating means so as to operate the base station in conformity with that operating protocol.

3. A network as claimed in claim 2, wherein at least some of said mobile terminals have means for downloading of operating instructions from the network.

4. A method of setting up a connection between a terminal and a base station in a cellular mobile communications network adapted to service mobile terminals having different operating protocols so as to provide roaming facilities for those terminals, the network including a plurality of multimode base stations controlled via a base station controller and each comprising a plurality of protocol dedicated control units, a soft radio unit coupled to an antenna and arranged to function as a slave in both transmit and receive modes under the control of a selected one of said control units, the method comprising:

for a call initiated by a service request to the network from a mobile terminal; at the base station, relaying the mobile terminal request for service from the base station to the base station controller; at the base station controller, determining in response to said service request the protocol required to service that request, and sending a command signal to the base station identifying that protocol; for a call initiated via the network to a mobile terminal, determining from stored information relating to the mobile terminal an operating protocol requirement for that terminal, downloading stored operating software for performing that operating protocol into the base station controller, and sending a command signal to the base station identifying that protocol; and at the base station, responsive to said command signal, selecting that one of said control units corresponding to the operating protocol for controlling the soft radio unit so as to establish communication with the mobile terminal.

5. A method as claimed in claim 4, wherein the operating protocol employed by a mobile terminal requesting service is determined from the frequency of radio transmissions from that terminal.

6. A method as claimed in claim 5, and including downloading of operating software from the network to a said terminal.

7. A method as claimed in claim 6, wherein a said operating protocol is determined by negotiation between the network and a said mobile terminal.

8. A cellular mobile communications network adapted to service mobile terminals having different operating protocols so as to provide roaming facilities for those terminals, the network including a plurality of multimode base stations controlled via a base station controller and each comprising; a plurality of protocol dedicated control units, a soft radio unit coupled to an antenna and arranged to function as a slave in both transmit and receive modes under the control of a selected one of said control units, means for relaying a mobile terminal request for service to the base station controller, and selection means for selecting one of said control units in response to a command received from the base station controller;

wherein said base station controller has means for determining, from a said mobile terminal request for service from a mobile terminal currently within an area served by that base station, the one of said different operating protocols to be associated with that terminal so as to set up a call from that terminal to the network, means for determining from stored information the operating protocol requirement of a terminal currently within the area served by that base station controller and to which a call is to be placed so as to set up a call to that terminal from the network, means for downloading, from a store associated with the base station controller, software operating instructions corresponding to the determined protocol for the mobile terminal so as to operate the base station controller in conformity with that protocol, and means for sending said command signal to the base station from which the request has been relayed so as to perform said control unit selection at that base station and thereby establish communication with the mobile terminal.

* * * * *